United States Patent [19]

Endo

[11] 4,365,606

[45] Dec. 28, 1982

[54] ENGINE STARTING APPARATUS FOR AN EXTREMELY COLD CLIMATE

[75] Inventor: Takuya Endo, Yokohama, Japan

[73] Assignee: Nissan Motor Co, Ltd., Yokohama, Japan

[21] Appl. No.: 113,066

[22] Filed: Jan. 17, 1980

[30] Foreign Application Priority Data

Jan. 17, 1979 [JP] Japan .................................. 54-4317

[51] Int. Cl.³ ............................................ F02M 31/00
[52] U.S. Cl. ................................ 123/556; 123/179 H
[58] Field of Search ........... 123/556, 552, 553, 179 H; 165/104 S; 126/400

[56] References Cited

U.S. PATENT DOCUMENTS

| | | | |
|---|---|---|---|
| 2,897,801 | 8/1959 | Kloss | 123/556 |
| 2,911,513 | 11/1959 | MacCracken | 165/104 S |
| 3,062,510 | 11/1962 | Percival | 165/104 S |
| 3,485,216 | 12/1969 | Lawrence | 165/104 S |
| 3,872,839 | 3/1975 | Russell | 123/556 |
| 4,122,679 | 10/1978 | Charron | 123/556 |

FOREIGN PATENT DOCUMENTS

| | | | |
|---|---|---|---|
| 2650946 | 5/1978 | Fed. Rep. of Germany | 123/556 |
| 671234 | 12/1929 | France | 123/556 |

Primary Examiner—Ronald H. Lazarus
Attorney, Agent, or Firm—Lane, Aitken, Kice & Kananen

[57] ABSTRACT

An engine starting apparatus for an extremely cold climate has a regenerator which stores heat of exhaust gas during operation of the engine. The regenerator has sufficient heat capacity to maintain the stored heat for at least 10 hours after stopping the engine. Suction gas to start the engine can be heated sufficiently to facilitate starting of the engine. Temperature control device mixes fresh air with air from the regenerator to obtain suitable suction temperature.

8 Claims, 9 Drawing Figures

ENGINE STARTING APPARATUS FOR AN EXTREMELY COLD CLIMATE

BACKGROUND OF THE INVENTION

The present invention relates to an engine starting apparaus effective in an extremely cold climate.

Recently, engine starting characteristics in cold region or climate have been substantially improved by increasing the battery capacity, mounting a strong ignition system or improving the suction system. Thus, starting difficulty is essentially removed up to about −20° C. However, in an extremely cold climate below −20° C., especially below −30° C., engine starting is very difficult without heating engine coolant or suction air.

Conventional heaters for the coolant or suction air consist of electric heater which is connected with power source in a garage, or coolant heater including a specific burner in which part of the vehicle fuel is burnt.

However, such conventional heaters necessitate external electric power source or specific burner which are not suitable to mount onto vehicles. Also, consumption of substantial electric energy or gasoline required for the conventional heaters must be taken into account.

SUMMARY OF THE INVENTION

The object of the present invention is to provide an improved engine starting apparatus for an extremely cold climate which, by utilizing a simple regenerator, eliminates the above mentioned disadvantages.

According to the present invention, there is provided an engine starting apparatus for an extremely cold climate, comprising a suction conduit passing ambient air to be supplied to the engine, an exhaust conduit passing exhaust gas from the engine, a regenerator having a regenerator body accommodated therein, means to connect the regenerator with the exhaust conduit at least when the engine is in operation to thereby store heat of the exhaust gas in the regenerator body for a relatively long time, means to connect the regenerator with the suction conduit at least when starting the engine to thereby heat the suction air, and means to control the temperature of the suction air to be within the range suitable for starting the engine.

Thus, even in an extremely cold climate of below −30° C., the engine can be started easily by passing and heating cold suction air through the regenerator up to the temperature of 10° to 20° C., for example, without requiring outer energy or elaborate arrangement.

Principle of the regenerator which is used in the present invention will be described.

When a vehicle is running, a portion of fuel energy (about 15 to 25%) is used as driving energy and the other portion (about 85 to 75%) is ejected into atmosphere largely as exhaust gas heat and partly as the heat of the coolant from a radiator. As one example, when a vehicle with a gasoline engine having a piston displacement of 2,000 cc is running at 100 km/h, exhaust gas temperature is about 750° C. and exhaust gas flow rate is about 90 kg/h. In this case, as shown in FIG. 1, when the atmospheric temperature is 20° C., heat dissipated into the atmosphere amounts to about 20,000 kcal/h.

When the exhaust gas is passed through a regenerator, a portion of ejected heat is stored in the regenerator for a relatively long time and can be used to heat the suction air when the engine is to be started again.

Some embodiments of the present invention will be described in detail by referring to the accompanying drawings.

DETAILED DESCRIPTION OF EMBODIMENTS

Figure 1:
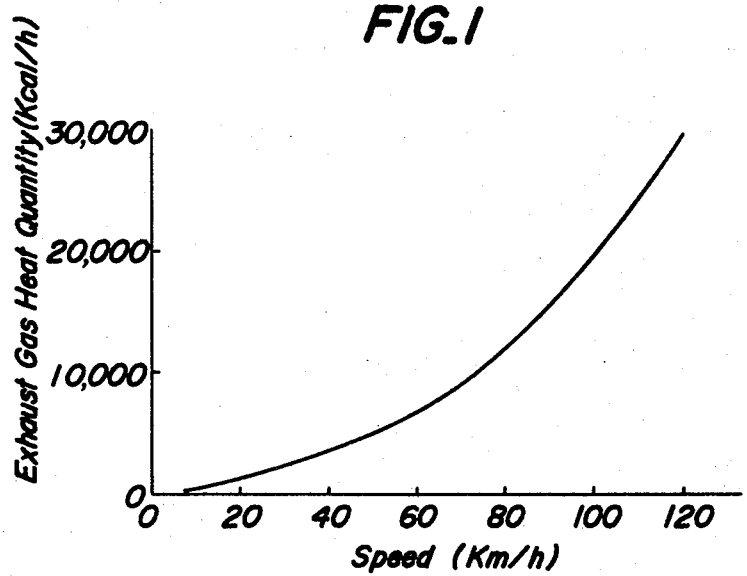
FIG. 1 is a diagram showing the relation between the vehicle speed and exhaust heat quantity.
Figure 2A:
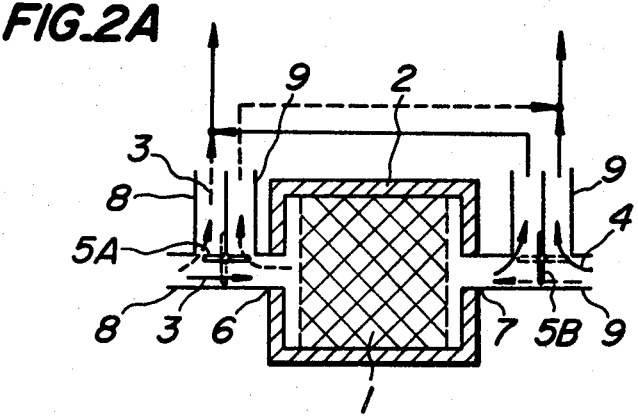
FIGS. 2A and 2B are illustrations of two forms of regenerator to be incorporated in the apparatus according to the present invention.

Referring to FIG. 2A, there is shown a regenerator according to the present invention which includes a housing 2 insulated by asbestos or glass wool, and a regenerator body or material 1 consisting essentially of granular alumina, magnesia or beryllia whose diameter is normally less than ten millimeter. The regenerator body is packed in the housing 2 having an inner volume of about 10 to 15 liters. The regenerator is provided with an inlet and an outlet ports 6 and 7. A common passage extends through the regenerator body 1 to selectively pass exhaust gas flow 3 from an exhaust conduit 8 and starting suction air flow 4 to a suction conduit 9. Changeover valves 5A and 5B are operated synchronously and control the regenerator in such a manner that, during the operation of the engine, the regenerator body 1 stores heat of the exhaust gas (shown by solid line) which is maintained for at least ten hours after stopping the engine and, at the time of starting the engine, the stored heat can sufficiently heat suction air (shown by broken line) to facilitate starting of the engine.

Figure 2B:
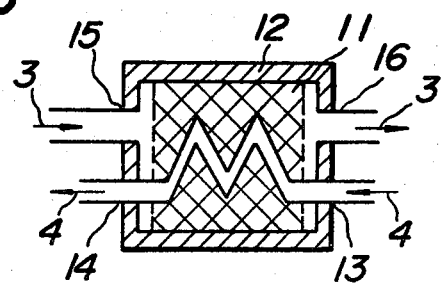

FIG. 2B shows another embodiment of the regenerator according to the present invention. In this embodiment, the regenerator has separate passages for the exhaust gas and suction air. Namely, a regenerator housing 12 has inlet and outlet ports 13 and 14 for the suction air, and inlet and outlet ports 15 and 16 for the exhaust gas. Regenerator body 11 forms mutually isolated passages, one for the suction air 4 and the other for the exhaust gas 3. By this arrangement, changeover valves as shown in FIG. 2A are not required.

Figure 5:
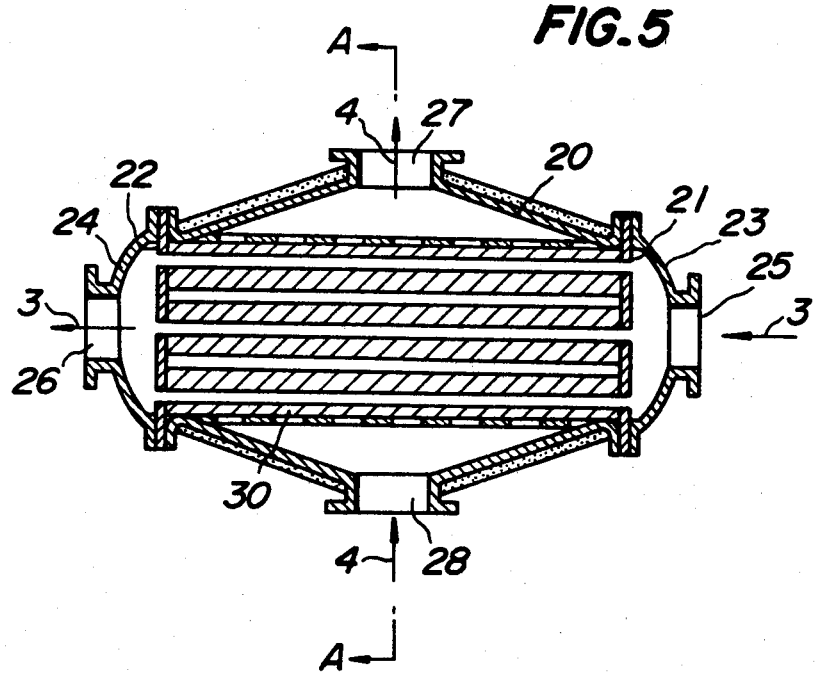
FIG. 5 is a longitudinal sectional view of one embodiment of the regenerator shown in FIG. 2B.
Figure 6:
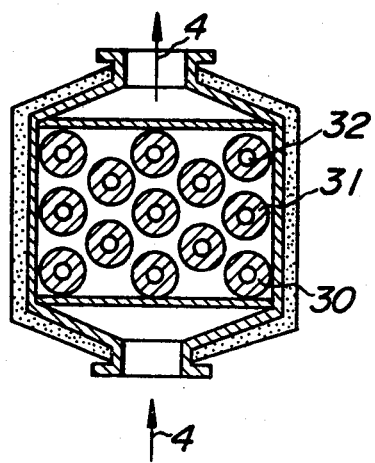
FIG. 6 is a sectional view taken along the line A—A of FIG. 5.
Figure 7:
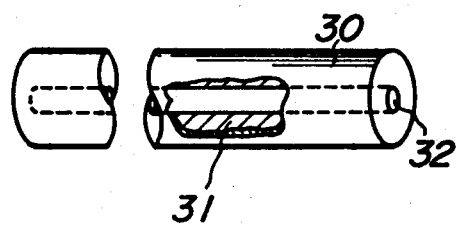
FIG. 7 is an enlarged perspective view of one regenerator capsule shown in FIG. 5.

One embodiment of the regenerator according to the arrangement of FIG. 2B is shown in FIGS. 5 and 6. A regenerator housing 20 has generally square openings 21 and 22 closed respectively by covers 23 and 24 which are formed with inlet and outlet ports 25 and 26 for the exhaust gas 3. The housing 20 is formed with inlet and outlet ports 27 and 28 for the suction air 4. In the housing 20, a plurality of regenerator capsules 30 are arranged with predetermined space therebetween. The capsule 30 shown in FIG. 7 is formed as a double cylinder having an inner and an outer walls between which the regenerator material 31 is packed. The inner wall of the capsule defines an exhaust gas-passage 32 which communicates with the ports 25 and 26. The outer walls of the capsules 30 define passage for the suction air which is isolated from the exhaust gas.

Regenerator body or material 31 to be packed or poured in the liquid state into the capsule 30 is selected from materials having a large heat capacity and which is not subjected to thermal cracks up to the temperature of about 700° C. Eutectic salt of lithium fluoride and magnesium fluoride (LiF-MgF$_2$), and eutectic salt of lithium fluoride and lithium hydroxide (LiF-LiOH) may preferably be used.

Figure 8:
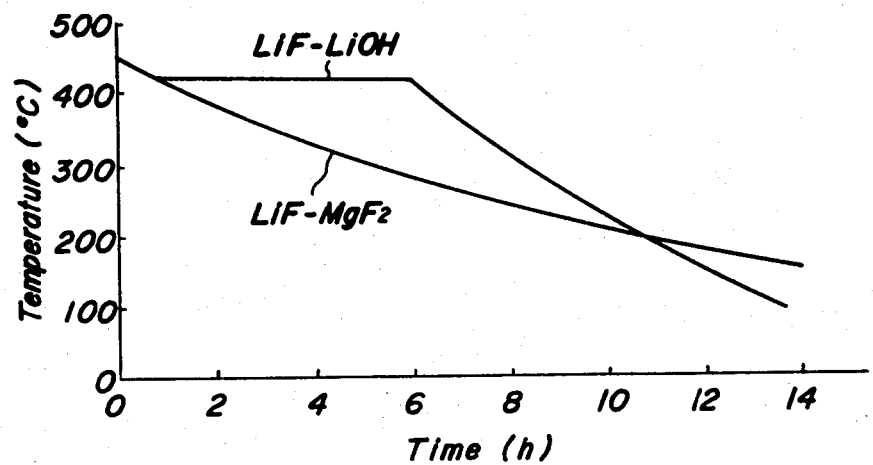
FIG. 8 is a diagram showing the temperature of the regenerator shown in FIGS. 5 to 7.

FIG. 8 shows regenerating characteristics of the regenerator shown in FIG. 5 with dimensions of 20 cm×30 cm×15 cm, volume of the regenerator material of 2.5 liters, and thickness of the outer insulation layer of 2 cm. The regenerator is heated up to 450° C. by the exhaust gas while the engine is in operation and cooled by the atmospheric air whose temperature is −10° C. As shown in FIG. 8, the cooling curves are different according to the regenerator materials used. However, the temperature of the regenerator material cooled for 12 hours, for example, is still 150° to 180° C., so that suction air can be heated sufficiently to facilitate starting of the engine. As shown in FIG. 8, the heat retention capability of the regenerator is substantially greater than that of the engine itself.

Figure 3:
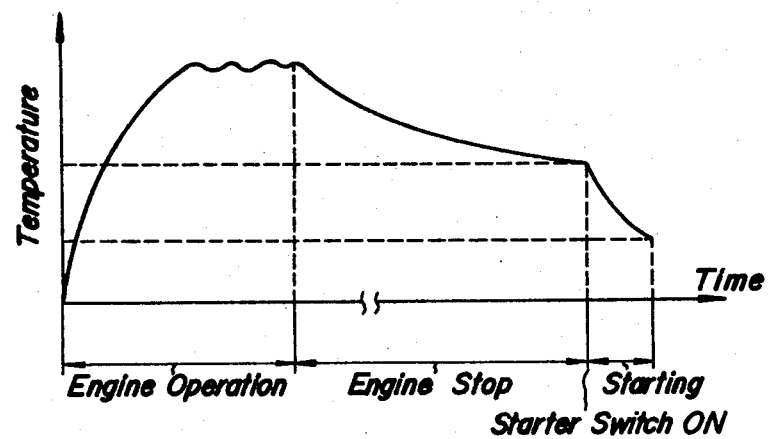
FIG. 3 is a diagram showing the temperature characteristic of a regenerator in relation to the vehicle operating conditions.

Operation of the engine starting apparatus according to the present invention will be described with reference to FIGS. 3 and 4.

During cruising of the vehicle equipped with the apparatus according to the present invention, high temperature exhaust gas 3 is passed through the regenerator and then exhausted into the atmosphere. As shown in FIG. 3, the regenerator is heated by the exhaust gas to an average exhaust gas temperature. When the engine is stopped, the regenerator is cooled gradually as shown in FIGS. 3 and 8 through the insulation layer of the regenerator housing. The temperature decreasing curve differs in accordance with nature and heat capacity of the regenerator material and with the thickness of the insulation material. However, when the regenerator is suitably designed, sufficient temperature is still available for more than 10 hours after engine stop, as shown in FIG. 8.

Figure 4:
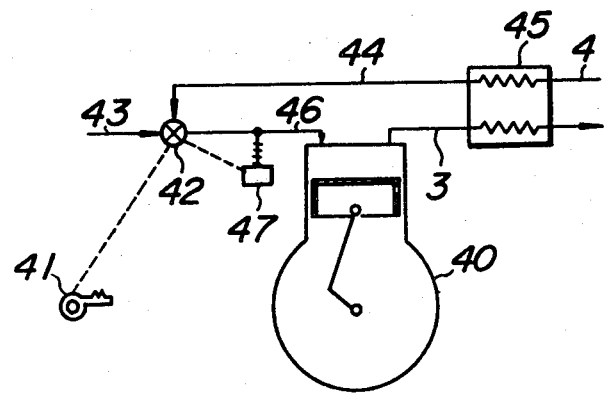
FIG. 4 is an illustration of an engine starting system according to the present invention.

As shown in FIG. 4, to start an engine 40, a starter switch 41 is operated. A suction air regulating valve 42 is actuated to mix cold ambient air 43 with heated air 44 which has passed through the still warm regenerator 45 to provide warm suction air 46 of about 10° to 20° C. which is suitable to start the engine 40. A temperature sensor 47 detects temperature of the suction air 46 and controls opening of the valve 42.

After starting the engine 40, the engine 40 can be operated by cold ambient air 43 only. Thus, by releasing the starter switch 41, the starting air regulating valve 42 moves to shut off warm air 44 through the regenerator 45. As shown in FIG. 3, the regenerator is cooled rapidly during the starting operation. The regenerator is again operated to store heat of the exhaust gas.

It will be appreciated that, even though the ambient temperature is as cold as below −30° C., starting air can be heated to about 10° to 20° C. by means of the regenerator, so that the engine can be started in a facilitated manner without external electric power source or gasoline burner which requires consumption of electric energy or gasoline.

What is claimed is:

1. An engine starting apparatus for an extremely cold climate, comprising a suction conduit passing ambient air to be supplied to the engine, an exhaust conduit passing exhaust gas from the engine, a regenerator having a regenerator body accommodated therein, means to connect the regenerator with the exhaust conduit at least when the engine is in operation to thereby store heat of the exhaust gas in the regenerator body, means to connect the regenerator with the suction conduit at least when starting the engine to thereby heat the suction air, and means to control the temperature of the suction air to be within the range suitable for starting the engine, said regenerator having sufficient heat retention capability to heat the suction air from −30° C. to about 10° to 20° C. ten hours after engine stop.

2. An apparatus as claimed in claim 1, wherein said control means includes a temperature sensor detecting the temperature of the suction air which is supplied to the engine, and a regulating valve controlled by the temperature sensor and mixing the air having passed through the regenerator with unheated fresh ambient air to thereby maintain the desired temperature of the suction air.

3. An apparatus as claimed in claim 1, wherein said regenerator body consists essentially of eutectic salt of lithium fluoride and magnesium fluoride.

4. An apparatus as claimed in claim 1, wherein said regenerator body consists essentially of eutectic salt of lithium fluoride and lithium hydroxide.

5. An apparatus as claimed in claim 1, wherein said regenerator is formed with a common passage for selectively passing the exhuast gas and the suction air, and said means to connect the regenerator with the exhaust conduit and with the suction conduit include a pair of changeover valves each disposed on opposite sides of the regenerator, the changeover valves being synchronously operated to connect the regenerator selectively with the exhaust conduit or with the suction conduit.

6. An apparatus as claimed in claim 1, wherein said regenerator is formed with mutually isolated first and second passages, the exhaust gas being passed through the first passage and the air to be heated being passed through the second passage.

7. An apparatus as recited in claim 1, wherein said means to connect the regenerator with the suction conduit at least when starting the engine operates to disconnect the suction conduit from the regenerator when the starting of the engine is completed.

8. An engine starting apparatus for an extremely cold climate, comprising a suction conduit passing ambient air to be supplied to the engine, an exhaust conduit passing exhaust gas from the engine, a regenerator having a regenerator body accommodated therein, means to connect the regenerator with the exhaust conduit at least when the engine is in operation to thereby store heat of the exhaust gas in the regenerator body, means to connect the regenerator with the suction conduit at least when starting the engine to thereby heat the suction air, and means to control the temperature of the suction air to be within the range suitable for starting the engine, said regenerator being formed with mutually isolated first and second passages, the exhaust gases being passed through the first passage and the air to be heated passing through the second passage, said regenerator including a plurality of regenerator capsules, each having an inner and outer cylindrical wall defining therebetween a space packed with the regenerator body, the capsules being spaced from each other so that the outer cylindrical walls define therebetween one of said first and second passages while the inner walls of the capsules encircle the other of said first and second passages.

* * * * *